(12) United States Patent
Anikitchev

(10) Patent No.: US 6,493,148 B1
(45) Date of Patent: Dec. 10, 2002

(54) INCREASING LASER BEAM POWER DENSITY

(75) Inventor: Serguei Anikitchev, Tucson, AZ (US)

(73) Assignee: Opto Power Corporation, Tucson, AZ (US)

( * ) Notice: Subject to any disclaimer, the term of this patent is extended or adjusted under 35 U.S.C. 154(b) by 0 days.

(21) Appl. No.: 09/710,327

(22) Filed: Nov. 8, 2000

(51) Int. Cl.[7] .................. G02B 27/14; G02B 27/110
(52) U.S. Cl. .................... 359/634; 359/618
(58) Field of Search .................. 359/618, 634, 359/640, 638, 641, 625, 115, 124, 583, 833, 831; 385/36

(56) References Cited

U.S. PATENT DOCUMENTS

| | | | | |
|---|---|---|---|---|
| 3,230,851 A | * | 1/1966 | Raymond | 396/152 |
| 5,777,674 A | * | 7/1998 | Ohmuro | 348/338 |
| 6,175,452 B1 | * | 1/2001 | Ullmann | 359/641 |
| 6,301,046 B1 | * | 10/2001 | Tai et al. | 359/498 |
| 6,400,512 B1 | * | 6/2002 | Hildebrandt | 347/241 |

* cited by examiner

Primary Examiner—Georgia Epps
Assistant Examiner—Saeed Seyrafi
(74) Attorney, Agent, or Firm—Howard R. Popper

(57) ABSTRACT

A group of diode lasers emitting beams at a first wavelength is positioned above and below a stack of laser diodes emitting beams at a second wavelength. The first wavelength beams are directed to a dichroic portion of a compound prism and are reflected outwardly. The second wavelength beams are directed to the opposite surface of the dichroic portion but pass through without reflection and so are directed into substantially the same outward plane as the first wavelength beams. The compound prism combines beams of two different wavelengths to achieve a greater power density in the given plane than can be obtained with beams of either wavelength alone. A second stack of dual wavelength laser beams may be concentrated with a second compound prism and the two stacks of laser beams may be combined using an array of interleaved, laterally reversed, identical, angular plates of refractive material so as to alternately overcome the lateral displacement of the beams from the laterally separated stacks of laser diodes.

5 Claims, 1 Drawing Sheet

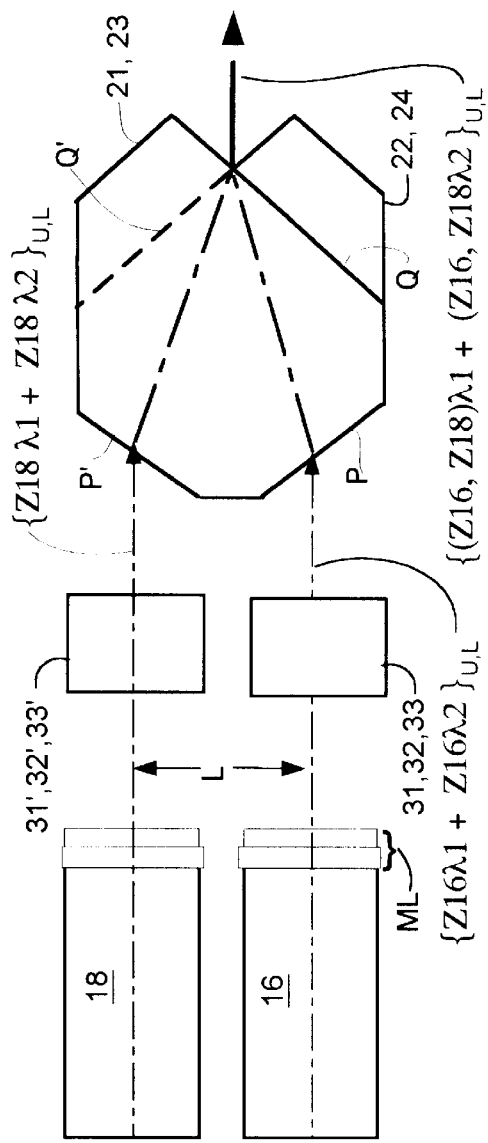
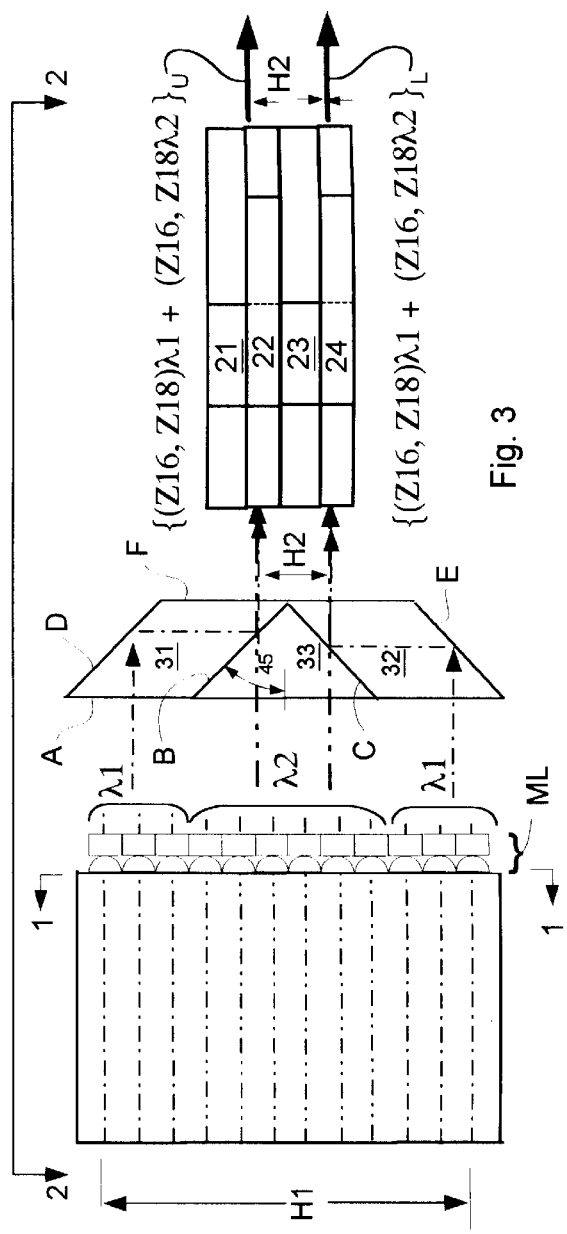
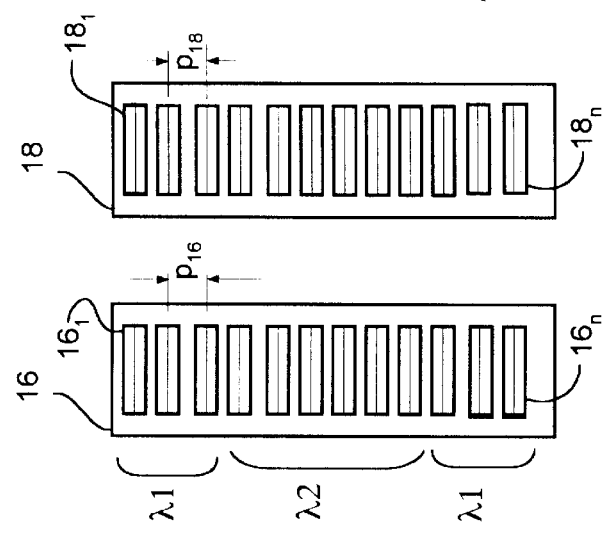

INCREASING LASER BEAM POWER DENSITY

REFERENCE TO RELATED APPLICATION

This application is related to the copending application of G. Treusch, entitled "Focusing Multiple Laser Beams", Ser. No. 09/710,800, filed Nov. 8, 2000 assigned to the assignee of the present invention, the substance of which is incorporated herein by reference.

FIELD OF THE INVENTION

This invention relates to high power lasers for industrial applications and, more particularly, to collimating or focusing the beams from the number of laser sources needed to achieve a desired power density.

BACKGROUND OF THE PRIOR ART

Because a diode laser source emits a beam which typically exhibits different degrees of divergence along different axes, a lens or series of lenses such as microlenses are typically used to help focus the emitted light. It should be understood that "focusing" is used here in the sense which includes a range of effects that a lens may have on a diverging beam, from decreasing the divergence to collimation to convergence to a small spot. Generally, the emitting apertures of a laser diode are rectangular in shape with the long dimension having a size of typically hundreds of microns, while the short dimension is typically one micron in size. Diffraction effects cause the emerging radiation to diverge, with the divergence angle being inversely proportional to the size of the aperture. The short dimension of the aperture is comparable to the typical laser diode wavelength of approximately eight hundred nanometers; diffraction effects result in large beam divergence in this, the "fast axis", direction which may be as high as seventy five degrees. The sign of the divergence angle is known as the numerical aperture (NA), the beam having a lower numerical aperture along the direction of the stripe than perpendicular to the stripe. Typical values would be 0.1 NA and 0.33 NA respectively. In the applications of concern here, the radiation must be focused at some distance from the laser diode and it is desirable to concentrate the beam diameter so as to maximize the power density at the point of focus.

To provide more power than can be obtained from a single solid state laser, several laser sources can be assembled into a laser "bar". Koester U.S. Pat. No. 3,670,260; U.S. Pat. No. 4,185,891; and Sprague, et al U.S. Pat. No. 4,428,647 show various ways to compensate for the fact that laser bars emit spaced-apart beams. In particular, the '891 and '647 patents show the use of micro-lenses between the laser and an objective lens in which each micro-lens reduces the angle of divergence of a respective light beam leaving the emitting surface of the laser bar. Reducing the divergence angle of the beams allows the objective lens to reduce the beam spacing to a degree that is substantially less than the set spacing between the beams at the laser bar.

While the use of a microlens array reduces the divergence angles of the individual beams emanating from the emitting sources of a diode laser, a laser bar which incorporates several, transversely separated diode lasers requires that an objective lens having a large numerical aperture be used if the beam is to be concentrated into a usefully small spot. Large numerical aperture objective lenses tend to be expensive. The problem becomes even more difficult when more power is required than can be delivered by a single laser bar.

If it is attempted to use two laser bars, the lateral separation of their beams adds to the difficulty. It would be extremely advantageous to be able to focus such widely separated laser beams to an acceptable spot size without requiring the use of an expensive objective lens.

In the copending application of G. Treusch, a stack of laser beams emitted from a pair of laterally separated stack of laser diodes bars are focused into a single, vertical plane of stacked laser beams through the use of an interleaved array of angular glass plates. The array of glass plates presents complementary oblique entrance surfaces to the laser beams from successive levels of the laser bars. Each of the glass plates presents an exit surface parallel to its entrance surface, the parallel entrance and exit surface of said plates being spaced apart a sufficient distance to refract said laser beams so as to substantially overcome lateral displacement among the laser beams.

While the aforementioned application of G. Treusch eases the focusing requirements imposed on the objective lens by causing the laser beams from laterally separated stacks of laser bars to lie in a single vertical plane, not enough power may be available from the two stacks to achieve a desired power density in the beam that can be focused by a lens having a given numerical aperture. It would be extremely advantageous to be able to increase the power density provided from one or more stacks of laser diode bars.

SUMMARY OF THE INVENTION

In accordance with the principles of the present invention, in one illustrative embodiment, a greater power density is obtained by combining the beams from two different wavelength laser diode bars in a stack by using a compound prism having a dichroic portion that reflects one wavelength but passes the other. A group of diode lasers emitting beams at a first wavelength is positioned above and below a stack of laser diodes emitting beams at a second wavelength. The first wavelength beams are directed to a dichroic portion of the compound prism and are reflected outwardly. The second wavelength beams are directed to the opposite surface of the dichroic portion but pass through without reflection and so are directed into substantially the same outward plane as the first wavelength beams. Accordingly, the beams of two different wavelengths are combined in the outward direction to achieve a greater power density in the given plane than can be obtained with beams of either wavelength alone. Advantageously, a second stack of dual wavelength laser beams may be concentrated with a second compound prism and the two stacks of laser beams may be combined using the glass plate technique disclosed in the above-mentioned copending application of G. Treusch.

BRIEF DESCRIPTION OF THE DRAWING

The foregoing and other objects of the present invention may become more apparent from a reading of the ensuing description together with the drawing, in which:

FIG. 1 is an end view of a pair of laser bar stacks each emitting laser beams of two different wavelengths;

FIG. 2 is a top view of the stacks of laser bars together with a pair of the compound prisms of the invention and an array of interleaved glass plates; and FIG. 3 is a side view of the apparatus of FIG. 2.

GENERAL DESCRIPTION

FIG. 1 shows an end view of a pair of laterally disposed laser bar assemblages 16, 18. Each laser bar assemblage has a respective, vertically stacked array of n solid state laser diode sources $16_1$ through $16_n$ and $18_1$ through $18_n$. The stack of laser diodes of assemblage 16 have a uniform pitch $p_{16}$ while the stack of laser diodes of assemblage 18 has a corresponding uniform pitch $p_{18}$. The total number of laser diodes, $16_1$ through $16_n$ plus $18_1$ through $18_n$ is determined by the power required to perform a desired function, such as welding, which cannot easily be performed with less than the sum total of power contributed by all of the laser diodes properly focused into a spot of sufficiently small area to achieve a desired power density. As is well known, it is conventional practice to compensate for the vertical and horizontal dispersion angles of the beams emerging from a laser bar by using an array of cylindrical minilenses such as ML.

As disclosed in the above-mentioned copending application of G. Treusch, the beams from laterally separated laser bar stacks can be combined using an interleaved stack of glass plates similar to plates 21, 22 shown in FIG. 2.

When the total power density that is required is greater than can be obtained by combining the beams from two stacks each having a given number of laser diodes, it would seem to be apparent to increase the number of diodes in each stack. Unfortunately, the total number of vertically stacked diodes may be so great that the resultant stack of beams may be greater than can efficiently be focused by a conventional objective lens (not shown).

In accordance with the principles of the invention, however, the beams from a large number of vertically stacked diodes, illustratively of height H1 (see FIG. 3) which may be higher than can conveniently be focused by a given objective lens (not shown), may nevertheless be easily focused by a comparatively inexpensive objective lens (not shown) by using a compound prism having a dichroic portion which concentrates the beams from two different wavelengths into a given plane. Let the stack of diodes of height H1 contain n/2 diodes of wavelength λ1 together with n/2 diodes of wavelength λ2. Let the diodes be arranged so that n/4 diodes of wavelength λ1 are positioned in the stack above and below a central group of n/2 diodes of wavelength λ2. Position a compound prism having a dichroic portion so that the beams of wavelength λ1 are reflected by the dichroic portion while the beams of wavelength λ2 pass through without reflection so as to be directed into the same plane as the first wavelength beams.

Consider first the beams from stack 16, as shown in top view FIG. 2 and in side view FIG. 3. The beams from the central group of n/2 diodes of wavelength λ2 are directed rightward to the oblique surfaces B, C of the central, dichroic portion 33 of compound prism 31, 32, 33 (see FIG. 3). The beams of wavelength λ2 pass through surfaces B and C toward the right.

The beams from the n/4 diodes of wavelength λ1 are directed rightward but are reflected 90 degrees by surface D of non-dichroic portion 31 respectively, so as to be directed to opposite oblique surface B of dichroic prism portion 33 which is parallel to surface D.

The beams from the n/4 diodes of wave length λ1 (below the central group) are directed rightward, but are reflected 90 degrees (upward) by surface E of non-dichroic portion 32 of the compound prism so as to be directed to opposite oblique surface C of dichroic portion 33 (which is parallel to surface E). At surface C the beams of wavelength I1 are reflected 90 degrees (in the reverse direction from the reflection at surface E) and pass onward to the right having thus undergone successive 90 degree reflections; In this manner the many vertically stacked beams of height H1 from stack 16 are concentrated into upper (U) and lower (L) vertically stacked beam groups $(Z16\lambda 1 + Z16\lambda 2)_u$ and $(Z16\lambda 1 + Z16\lambda 2)_L$ of height H2 which is less than H1, and so may be more easily focused by a given objective lens (not shown).

Referring to FIG. 2, the many vertically stacked dual frequency laser beams contained in stack 18 is concentrated by compound dichroic prism 31', 32', 33' in similar fashion to that concentrated by prism 31, 32, 33 so that at the righthand side of prism 31', 32', 33' two vertically stacked beam groups $(Z18\lambda 1 + Z18\lambda 2)_u$ and $(Z18\lambda 1 + Z18\lambda 2)_L$ emerge which are of height H2. The beam groups from stack 18 are parallel to the groups from stack 16 but laterally separated by distance L.

To combine the beams from two laterally separated stacks of laser bars it is advantageous to employ the interleaved glass plate technique disclosed in the above-mentioned application of G. Treusch. Thus, to combine the beams from two laterally separated stacks of laser bars it is advantageous to have the pitch $p_{16}$ of stack 16 equal the pitch pig of stack 18 and to vertically offset one stack from the other by one-half pitch. In this manner, the beams from stack 16 impinge on faces P of the glass plate stack while the beams from stack 18 impinge on faces P'.

More particularly, the beams from stack 16 enter surfaces P of plates 21, 23 while the beams from stack 18 enter surfaces P' of plates 22, 24. For example, laser beams $(Z16\lambda 1 + Z16\lambda 2)_u$ from the central and upper portion of laser assemblage 16 are refracted by the air/glass interface at entrance surface P of glass plate 21. This laser beam is again refracted at the glass/air interface at the exit surface Q of plate 21. Laser beams $(Z16\lambda 1 + Z16\lambda 2)_L$ from the central and lower portion of assemblage 16 are refracted by the air/glass interface at the entrance surface P of glass plate 23. This laser beam is again refracted at the glass/air interface at the exit surface Q of plate 23. The angle of refraction at each air/glass interface is substantially opposite in sign to the angle of refraction at the glass/air interface of the same plate so that, at the right hand side of FIG. 2, the stack of beams $(Z16\lambda 1 + Z16\lambda 2)_{U,L}$ from assemblage 16 is directed inward.

Similarly, laser beams $(Z18\lambda 1 + Z18\lambda 2)_u$ from the central and upper portion of laser assemblage 18 are refracted by the air/glass interface at entrance surface P' of glass plate 22. This laser beam is again refracted at the glass/air interface at the exit surface Q' of plate 22. Laser beams $(Z18\lambda 1 + Z18\lambda 2)_L$ from the central and lower portion of assemblage 18 are refracted by the air/glass interface at the entrance surface P' of glass plate 24. This laser beam is again refracted at the glass/air interface at the exit surface Q' of plate 24 so that, at the right hand side of FIG. 2, the stack of beams $(Z18\lambda 1 + Z18\lambda 2)_{U,L}$ from assemblage 18 is directed inward and interleaved into the same vertical plane as the stack of beams from assemblage 16, thereby overcoming the lateral separation L between the Z axes of the beams from the two laser bar assemblages.

It will be apparent that the combined exit beam which occupies a single vertical plane can more easily be focused by a simple objective lens (not shown) than could possibly be done with exit beams in separate parallel planes. Accordingly the object of the invention has been achieved.

What has been described is deemed to be illustrative of the principles of the present invention. Further and other modifications will be apparent to those skilled in the art and may be made without, however, departing from the spirit and scope of the invention.

What is claimed is:

1. Apparatus for collimating a stack of laser beams from a stack of n laser diodes having a height H1 greater than can be collimated by an objective lens having a given numerical aperture, comprising:

a group of n/4 laser diodes having a first wavelength arranged in said stack above and below a group of n/2 laser diodes having a second wavelength, where n is an even number not less than four;

a compound prism having a central dichroic portion that reflects said first wavelength but passes said second wavelength undeflected; said compound prism having sections to direct said first wavelength beams to opposite oblique surfaces of said dichroic portion whereby said beams of said first and said second wavelengths are concentrated into a height H2 less than H1 lying a single vertical plane.

2. Apparatus for collimating a stack of laser beams according to claim 1 further comprising:

a second group of n laser diodes arranged in a stack laterally displaced from said first stack;

an array of interleaved, laterally reversed, identical, angular plates of refractive material; successive ones of said plates being disposed to present complementary oblique entrance surfaces to the laser beams from said stacks, each plate having an exit surface parallel to its entrance surface, the parallel entrance and exit surface of said plates being spaced apart to refract the laser beams so as to alternately overcome the lateral displacement of the beams from said laterally separated stacks of laser diodes.

3. A compound prism for concentrating laser beams of two different wavelengths from a stack of laser diodes, comprising:

a first light transmitting portion having parallel surfaces for successively reflecting beams of one of said wavelengths from said stack;

a second light transmitting portion having a surface contiguous to one of said parallel surfaces, said surface being capable of transmitting the other of said wavelengths without substantial reflection, whereby light beams of said two different wavelengths are combined into the same plane.

4. A compound prism according to claim 3 further comprising a third light transmitting portion having parallel surfaces for successively reflecting beams of said one wavelength, said third light transmitting portion having a first surface contiguous to a second surface of said second light transmitting portion, said second surface being capable of transmitting said other of said wavelengths without substantial reflection, said first and said second surface of said third portion being at substantially right angles to one another.

5. A compound prism according to claim 4 wherein said stack of laser diodes includes a first and second group of diodes producing beams of said one wavelength, said first and second group of diodes being disposed at opposite ends of a third group of diodes producing beams of said other of said wavelengths; said first and said second portions of said compound prism being disposed to intercept beams from said first and second group of diodes and said third light transmitting portion being disposed to intercept beams from said third group of diodes.

* * * * *